(12) United States Patent
Spalink et al.

(10) Patent No.: US 7,839,275 B2
(45) Date of Patent: Nov. 23, 2010

(54) METHODS, SYSTEMS AND COMPUTER PROGRAM PRODUCTS FOR CONTROLLING A CLIMATE IN A BUILDING

(75) Inventors: Jan-Dieter Spalink, Durham, NC (US); Randall C. Nortman, Cary, NC (US)

(73) Assignee: Truveon Corp., Durham, NC (US)

( * ) Notice: Subject to any disclaimer, the term of this patent is extended or adjusted under 35 U.S.C. 154(b) by 0 days.

(21) Appl. No.: 11/270,386

(22) Filed: Nov. 9, 2005

(65) Prior Publication Data
US 2006/0111816 A1 May 25, 2006

Related U.S. Application Data

(60) Provisional application No. 60/626,306, filed on Nov. 9, 2004.

(51) Int. Cl.
*G08B 23/00* (2006.01)
(52) U.S. Cl. ............... 340/501; 700/297; 236/44 R
(58) Field of Classification Search ............ 340/501, 340/500; 70/276, 299, 279; 700/297, 299, 700/300, 279; 236/44 R, 44 A, 44 C
See application file for complete search history.

(56) References Cited

U.S. PATENT DOCUMENTS

| | | | |
|---|---|---|---|
| 4,058,254 A | 11/1977 | Hallgreen | |
| 4,195,337 A | 3/1980 | Bertrand et al. | |
| 4,212,078 A * | 7/1980 | Games et al. ............ 700/2 |
| 4,347,712 A | 9/1982 | Benton et al. | |
| 4,475,685 A | 10/1984 | Grimado et al. | |
| 4,495,577 A | 1/1985 | Strunk et al. | |
| 4,663,703 A | 5/1987 | Axelby et al. | |
| 4,916,909 A | 4/1990 | Mathur et al. | |
| 5,083,501 A | 1/1992 | Yuill et al. | |
| 5,094,127 A | 3/1992 | Ishida et al. | |
| 5,115,967 A | 5/1992 | Wedekind | |
| 5,170,935 A * | 12/1992 | Federspiel et al. ....... 236/44 C |
| 5,197,666 A | 3/1993 | Wedekind | |
| 5,318,104 A | 6/1994 | Shah et al. | |
| 5,395,042 A | 3/1995 | Riley et al. | |
| 5,444,612 A | 8/1995 | Torii et al. | |
| 5,511,724 A | 4/1996 | Freiberger et al. | |
| 5,518,176 A | 5/1996 | Turner et al. | |

(Continued)

OTHER PUBLICATIONS

Cena, Krzysztof et al., "Field Study of Occupant Comfort and Office Thermal Environments in a Hot-Arid Climate," Final Report, ASHRAE RP-921, Dec. 1998.

(Continued)

*Primary Examiner*—George A Bugg
*Assistant Examiner*—Edny Labbees
(74) *Attorney, Agent, or Firm*—Myers Bigel Sibley & Sajovec

(57) ABSTRACT

Methods, systems and computer program products are provided for controlling a climate in a building. Sensed data is received at a local processor in the building. The sensed data is associated with the climate in the building, weather outside the building and/or occupants of the building. The received sensed data is compared at the local processor with corresponding predictive data associated with the climate in the building, weather outside the building and/or occupants of the building. One or more parameters associated with the climate of the building is adjusted at the local processor based on a result of the comparison of the received sensed data and the predictive data.

29 Claims, 6 Drawing Sheets

U.S. PATENT DOCUMENTS

| | | | |
|---|---|---|---|
| 5,579,994 | A | 12/1996 | Davis, Jr. et al. |
| 5,586,190 | A | 12/1996 | Trantow et al. |
| 5,590,205 | A | 12/1996 | Popovich |
| 5,602,929 | A | 2/1997 | Popovich |
| 5,680,337 | A | 10/1997 | Pedersen et al. |
| 5,715,320 | A | 2/1998 | Allie et al. |
| 5,737,934 | A | 4/1998 | Shah |
| 5,875,108 | A | 2/1999 | Hoffberg et al. |
| 5,901,246 | A | 5/1999 | Hoffberg et al. |
| 5,903,454 | A | 5/1999 | Hoffberg et al. |
| 5,920,477 | A | 7/1999 | Hoffberg et al. |
| 6,145,751 | A | 11/2000 | Ahmed |
| 6,230,501 | B1 | 5/2001 | Bailey, Sr. et al. |
| 6,319,599 | B1 | 11/2001 | Buckley |
| 6,330,799 | B1 | 12/2001 | Chatterjea |
| 6,439,469 | B1 | 8/2002 | Gruber et al. |
| 6,442,455 | B1 | 8/2002 | Kotre et al. |
| 6,454,178 | B1 | 9/2002 | Fusco et al. |
| 6,478,233 | B1 | 11/2002 | Shah |
| 6,498,958 | B1 | 12/2002 | Tateishi et al. |
| 6,557,771 | B2 | 5/2003 | Shah |
| 6,616,057 | B1 | 9/2003 | Kelly et al. |
| 6,621,507 | B1 | 9/2003 | Shah |
| 6,643,554 | B2 | 11/2003 | Gough et al. |
| 6,651,895 | B1 | 11/2003 | Kadle et al. |
| 6,659,360 | B1 | 12/2003 | Schaefer et al. |
| 6,698,663 | B2 | 3/2004 | Wang et al. |
| 6,719,623 | B1 | 4/2004 | Kodaveridan et al. |
| 6,832,251 | B1 | 12/2004 | Gelvin et al. |
| 6,850,252 | B1 | 2/2005 | Hoffberg |
| 6,865,825 | B2 | 3/2005 | Bailey, Sr. et al. |
| 7,089,087 | B2 * | 8/2006 | Dudley .................. 700/276 |
| 7,097,111 | B2 * | 8/2006 | Riley et al. ............ 236/49.3 |
| 7,130,719 | B2 * | 10/2006 | Ehlers et al. ............ 700/276 |
| 7,225,054 | B2 * | 5/2007 | Amundson et al. .......... 700/276 |
| 2003/0160104 | A1 | 8/2003 | Kelly et al. |
| 2003/0197426 | A1 * | 10/2003 | Carson et al. ................. 307/40 |
| 2003/0221717 | A1 | 12/2003 | Dessel |
| 2004/0133314 | A1 | 7/2004 | Ehlers et al. |
| 2004/0148950 | A1 | 8/2004 | Catzel |
| 2005/0077037 | A1 | 4/2005 | Pham et al. |
| 2005/0102068 | A1 * | 5/2005 | Pimputkar et al. .......... 700/291 |
| 2005/0194455 | A1 | 9/2005 | Alles |
| 2007/0084937 | A1 * | 4/2007 | Ahmed ..................... 236/44 C |

OTHER PUBLICATIONS

Heidari, Shahin et al., "A Comparative Analysis of Short-term and Long-term Thermal Comfort Surveys in Iran," Centre for the Built Environment, Sheffield Hallam University, Sheffield, UK (p. 223-234).

International Search Report and Written Opinion of the International Searching Authority corresponding to PCT/US2005/040401, mailed Mar. 22, 2006.

Murakami, Shuzo et al., "Indoor Climate Design Based on Feedback Control of HVAC Coupled Simulation of Convection, Radiation, and HVAC Control for Attaining Given Operative Temperature," Institute of Industrial Science, University of Tokyo, Tokoy, Japan.

Nicol, J. Fergus et al., "Adaptive Thermal Comfort and Sustainable Thermal Standards for Buildings," Oxford Centre for Sustainable Development, Oxford Brookes University, Oxford, UK (p. 45-59).

Olesen, B.W., Ph.D., "Introduction to the New Revised Draft of EN ISO 7730," Wirsbo-VELTA GmbH, Norderstedt/Germany (p. 31-44).

Parsons, KC, "Introduction to Thermal Comfort Standards," Loughborough University, UK (p. 19-30).

Communication pursuant to Article 94(3) EPC, European Patent Application No. 05851422.5, Mar. 11, 2009, 5 pages.

* cited by examiner

METHODS, SYSTEMS AND COMPUTER PROGRAM PRODUCTS FOR CONTROLLING A CLIMATE IN A BUILDING

RELATED APPLICATION

This application claims the benefit of and priority to U.S. Provisional Application No. 60/626,306, entitled "ADAPTIVE RESIDENTIAL CLIMATE CONTROL," filed Nov. 9, 2004, the disclosure of which is hereby incorporated herein by reference as if set forth in its entirety.

FIELD OF THE INVENTION

The present invention relates generally to control systems, and more particularly, to climate control systems and related methods and computer program products.

BACKGROUND OF THE INVENTION

A competitive market motivates builders to provide high quality buildings that will retain their value based on superior structural integrity and, as energy prices continue to rise, are more energy efficient. Due to the construction of the building envelope, these buildings may or may not shield the occupant from negative infiltration of outdoor pollutants, for example, pollen, dust, humidity and the like. However, occupants also want to be comfortable and free from any indoor pollutants that may cause, for example, health problems. Buildings having superior structural integrity may have negligible infiltration of outdoor pollutants, but may not have sufficient means of controlling ventilation to dilute indoor pollutants. Residential builders in particular have been unable to reconcile these two opposing requirements and, therefore, typically shy away from building tight, superior structures and the use of more advanced climate control systems that would alleviate the shortfalls of the corresponding indoor environment. These residential builders subsequently expect homeowners to accept, for example, leaky, uncomfortable, unhealthy, and less energy-efficient buildings.

As a result, homeowners may experience unnecessary expenditures for expensive energy that is needed to control the climate/environment in the home. At times, homeowners may also experience personal discomfort, health problems, and/or the deterioration of some of their most valuable assets, i.e., the structure of the building itself, and/or many of its contents, such as hardwood floors, trim, furnishings, collectibles, artwork, books, furniture, musical instruments, and the like.

SUMMARY OF THE INVENTION

Some embodiments of the present invention provide methods, systems and computer program products for controlling a climate in a building. Sensed data is received at a local processor in the building. The sensed data is associated with the climate in the building, weather outside the building and/or occupants of the building. The received sensed data is compared at the local processor with corresponding predictive data associated with the climate in the building, weather outside the building and/or occupants of the building. One or more parameters associated with the climate of the building is adjusted at the local processor based on a result of the comparison of the received sensed data and the predictive data.

In further embodiments of the present invention, the received sensed data may be compared at the local processor with local performance metrics and/or specifications associated with the building. The one or more parameters associated with the climate may be adjusted at the local processor based on a result of the comparison of the received sensed data and the local performance metrics and/or specifications associated with the building.

In still further embodiments of the present invention, the sensed data associated with the building and sensed data associated with one or more other buildings may be received at a central processor coupled to the local processor. The received sensed data associated with the building and the one or more other buildings may be analyzed at the central processor. A control modification may be received at the local processor based on the analyzed sensed data and the local performance metrics and/or specifications associated with the building may be modified at the local processor based on the control modification.

In some embodiments of the present invention, non-sensed data associated with the building and non-sensed data associated with the one or more other buildings may also be received at the central processor. The received sensed and non-sensed data associated with the building and the one or more other buildings may be analyzed at the central processor. A control modification based on the analyzed sensed and non-sensed data, at the local processor may be received at the local processor.

In further embodiments of the present invention, the received sensed data may be compared the modified local performance metrics and/or specifications. The one or more parameters may be adjusted based on a result of the comparison of the received sensed data and the modified local performance metrics and/or specifications associated with the building. In certain embodiments of the present invention, the predictive data may be modified based on the control modification.

In still further embodiments of the present invention, the sensed data may be processed at the local processor such that the sensed data reflects physical attributes of the building. The sensed data associated with the building and/or the occupants of the building and the at least one other building and/or occupants of the at least one other building may be anonymized.

In some embodiments of the present invention, a request for a thermal comfort condition and/or a request for an indoor air quality condition may be received at the local processor. The one or more parameters associated with the climate of the building may be adjusted based on the received request so as to allow achievement of the requested thermal comfort condition and/or the indoor air quality condition. The received request for the thermal comfort condition and/or the indoor air quality condition may be converted into a form usable by the local processor to adjust the one or more parameters.

In further embodiments of the present invention, the one or more parameters may be adjusted to maintain a predetermined pressure differential between an interior of the building and an exterior of the building. The predetermined pressure differential may be maintained by allowing controlled amounts of air into the interior of the building.

DETAILED DESCRIPTION OF EMBODIMENTS OF THE PRESENT INVENTION

Figure 1A:
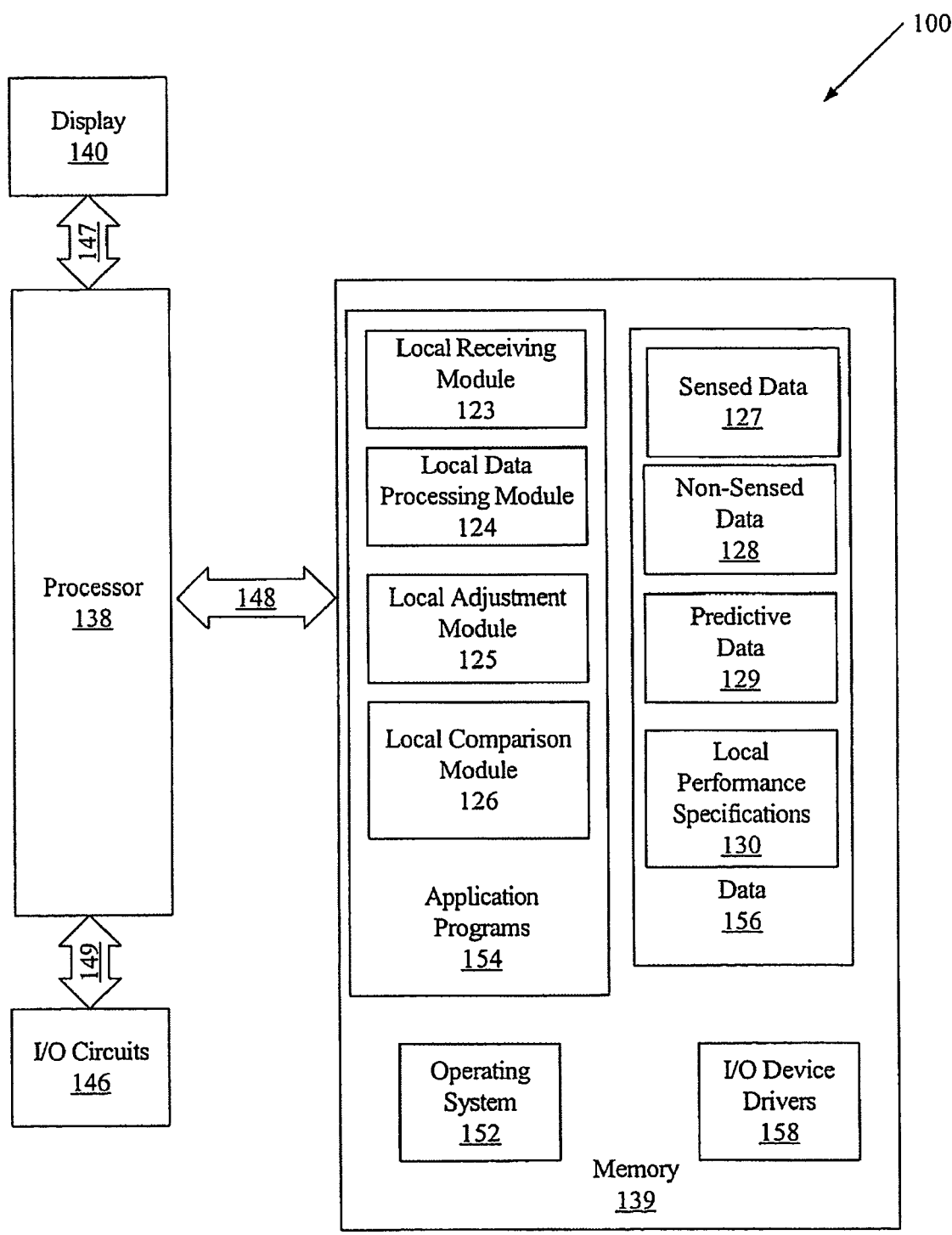
FIGS. 1A and 1B are block diagrams illustrating data processing systems according to some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that although the terms first and second are used herein to describe various elements these elements should not be limited by these terms. These terms are only used to distinguish one element from another element. Thus, a first element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As will be appreciated by one of skill in the art, the invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or in a visually oriented programming environment, such as VisualBasic.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The invention is described in part below with reference to flowchart illustrations and/or block diagrams of methods, systems and computer program products according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Some embodiments of the present invention that provide methods, systems and computer program products for controlling a climate in a building will now be discussed with respect to FIGS. 1 through 6. As discussed herein, some embodiments of the present invention involve improving the performance of indoor climate control systems in a building, which may be discussed herein as "adjusting at least one parameter associated with the climate." The performance of indoor climate control systems may be improved by, for example, managing the affects of infiltration of, for example, pollen, dust, humidity and the like on the indoor climate, controlling parameters that contribute to thermal comfort of the occupants of the building, controlling parameters that contribute to indoor air quality and managing the performance and operation of mechanical/electrical systems involved in controlling the indoor climate of the building. These things can be managed and/or controlled at a local level, i.e. at the building, or at a central location, i.e., at a central processor that is coupled to a plurality of buildings, as will be discussed further herein. As used herein, "coupled" refers to mechanically, electrically, wirelessly and/or optically coupled.

As used herein, "thermal comfort" refers to an occupant's comfort in the associated building climate. In particular, the quality of the building climate can have a significant impact on the comfort, health, and overall sense of well-being of building occupants. The occupants' sense of thermal comfort at any particular point in time is largely a function of the temperature, humidity and air circulation of their immediate environment, and it is influenced by personal factors, such as their age, sex, level metabolism, amount of clothing, and the physical activity that they are currently engaged in.

Occupants can adapt to changes in their thermal environments. The adaptation process involves physiological, behavioral and psychological mechanisms. Occupants can adjust their behavior, by adding or removing clothes, or by moving to a different location. Occupants can also make changes to their environment, for example, by adjusting the settings of their climate control system or by opening windows. Alternatively, occupants can change their expectations about the quality of an occupant's thermal environment. Furthermore, and over an extended time frame, their body is also able to acclimatize by adapting its physiological mechanisms to different climate regimens.

In some embodiments of the present invention a plurality of sensors are positioned inside and/or outside a building. These sensors are configured to collect sensed data. As used herein, "sensed data" refers to any data that may be detected or sensed by the sensors positioned inside and/or outside the building, for example, weather conditions, temperature, pressure, humidity, air flow and the like. Some embodiments of the present invention also use non-sensed data. For example, the non-sensed data may include type of materials used to construct the building, methods of construction used to construct the building, static information about the occupants of the building, such as gender or contact telephone number, and the like. Both "sensed" and "non-sensed" data will be referred to collectively herein as "reference data."

As used herein, "reference data" refers to recorded and persistently stored metrics and time series of metrics, which may include but are not limited to information about building structures, indoor climates, mechanical equipment, control systems, and/or the local weather, either in analog or digital format, and at various levels of resolution and accuracy. In some embodiments of the present invention, the term "persistently stored" may be used to indicate explicitly that the involved data are not just buffered in some registers for certain time periods that are required for some related processing operation, only to be discarded after the processing operation has been concluded, but are actually archived, so that they can be retrieved for future reference. Reference data may also include metrics about the building occupants, such as their number at a particular location within the building at any given point in time, their age, gender, race, marital status, level of education, occupation, income, financial assets, commuting times, number and age of children, number and age of dependents and relatives living in the house, temporary help and household employees, number and type of pets, smoking habits, eating and cooking habits, sleeping habits, personal hygiene regimens, physical exercise habits, recreational habits, house cleaning habits, use of household appliances, and other or similar socio-economic or lifestyle related variables. As used herein, "predictive data" refers to the result of one or more processing operations involving reference data, as well as mathematical algorithms, time series analysis, correlation, and the like, as will be discussed further below.

As used herein, "climate" refers to temperature, humidity, air pressure, air quality, ventilation, air circulation, and the like. Thus, climate may refer to more than just temperature and, in particular, climate may refer to any aspect of the indoor environment. As will be discussed herein, the reference data may be processed and analyzed at a local level to determine the thermal comfort of the occupants of the building individually and collectively, the energy efficiency/conservation associated with the building, the indoor air quality of the building, how the mechanical/electrical or climate control equipment in the building is performing and/or how the climate is affecting the structure itself and/or the contents of the structure. Once this reference data is obtained and processed, one or more parameters associated with the climate may be adjusted based on the reference data. For example, a comparison of the actual sensed data in the building with local performance metrics and/or specifications for the building may indicate that the climate control system in the building is not meeting certain of the performance metrics and/or specifications. Thus, one or more parameters of the climate control system may be adjusted to bring the actual performance of the climate control system in line with the local performance metrics and/or specifications.

As will be discussed further herein, some embodiments of the present invention begin with the planning phase of the construction of the building or building envelope. As used herein, "building envelope" refers to the entire outer shell of the building, i.e., walls, roof, windows and doors and the layers of building materials and components associated therewith. However, it will be understood that control systems according to embodiments of the present invention can be implemented in existing structures without departing from the scope of the present invention. Furthermore, even the most advanced envelope construction, by itself, may not achieve a certain level of indoor air quality and thermal comfort without a climate control system that regulates temperature, humidity, air quality, pressure, ventilation, and the like as provided by climate control systems according to some embodiments of the present invention, which will now be discussed with respect to FIGS. 1 through 6.

Referring first to FIG. 1A, an exemplary local data processing system 100, one or more of which may be included in a building according to some embodiments of the present invention will be discussed. As illustrated, the data processing system 100 includes a display 140, a processor 138, a memory 139 and input/output circuits 146. The data processing system 100 may be incorporated in, for example, a personal computer, server, router or the like. The processor 138 communicates with the memory 139 via an address/data bus 148, communicates with the input/output circuits 146 via an address/data bus 149 and communicates with the display via a connection 147. The input/output circuits 146 can be used to transfer information between the memory 139 and another computer system or a network using, for example, an Internet Protocol (IP) connection. These components may be conventional components, such as those used in many conventional data processing systems, which may be configured to operate as described herein.

In particular, the processor 138 can be any commercially available or custom microprocessor, microcontroller, digital signal processor or the like. The memory 139 may include any memory devices containing the software and data used to implement the functionality circuits or modules used in accordance with embodiments of the present invention. The memory 139 can include, but is not limited to, the following types of devices: cache, ROM, PROM, EPROM, EEPROM, flash memory, SRAM, DRAM and magnetic disk. In some embodiments of the present invention, the memory 139 may be a content addressable memory (CAM).

As further illustrated in FIG. 1A, the memory 139 may include several categories of software and data used in the data processing system 100: an operating system 152; application programs 154; input/output device drivers 158; and data 156. As will be appreciated by those of skill in the art, the operating system 152 may be any operating system suitable for use with a data processing system, such as OS/2, AIX or zOS from International Business Machines Corporation, Armonk, N.Y., Windows95, Windows98, Windows2000 or WindowsXP from Microsoft Corporation, Redmond, Wash., Unix or Linux. The input/output device drivers 158 typically include software routines accessed through the operating system 152 by the application programs 154 to communicate with devices such as the input/output circuits 146 and certain memory 136 components. The application programs 154 are illustrative of the programs that implement the various features of the circuits and modules according to some embodiments of the present invention. Finally, the data 156 represents the static and dynamic data used by the application programs 154, the operating system 152, the input/output device drivers 158, and other software programs that may reside in the memory 136. As illustrated in FIG. 1A, the data 156 may include sensed data 127, non-sensed data 128, predictive data 129 and/or local performance metrics and/or specifications 130 for use by the circuits and modules of the application programs 154 according to some embodiments of the present invention as discussed further herein.

As further illustrated in FIG. 1A, the application programs 154 include a local receiving module 123, a local data processing module 124, a local adjustment module 125 and a local comparison module 126. While the present invention is illustrated with reference to the local receiving module 123, the local data processing module 124, the local adjustment module 125 and the local comparison module 126 being application programs in FIG. 1A, as will be appreciated by those of skill in the art, other configurations fall within the scope of the present invention. For example, rather than being application programs 154, the local receiving module 123, the local data processing module 124, the local adjustment module 125 and the local comparison module 126 may also be incorporated into the operating system 152 or other such logical division of the data processing system 100, such as dynamic linked library code. Furthermore, the local receiving module 123, the local data processing module 124, the local adjustment module 125 and the local comparison module 126 are illustrated in a single data processing system, as will be appreciated by those of skill in the art, such functionality may be distributed across one or more data processing systems. Thus, the present invention should not be construed as limited to the configuration illustrated in FIG. 1A, but may be provided by other arrangements and/or divisions of functions between data processing systems. For example, although FIG. 1A is illustrated as having multiple modules, the modules may be combined into three or less or more modules may be added without departing from the scope of the present invention.

As discussed above, the local data processing system 100 may be provided in a building, for example, a residence in accordance with some embodiments of the present invention. The local receiving module 123 may be coupled to one or more sensors positioned inside and/or outside the building. Typically, hundreds of sensors will be positioned inside and/or outside the building to collect sensed data associated with weather conditions, indoor climate of the building, occupants and the like. For example, in some embodiments of the present invention, one or more sensors may be configured to obtain pressure differentials between all major outside wall surfaces and one or more enclosures or compartments on the inside of the building. These pressure differentials may be used to maintain a predetermined pressure differential between the interior compartments and the exterior of the building as will be discussed further below. Thus, the local receiving module 123 may be configured to receive the sensed data 127 collected by the sensors positioned inside and/or outside the building.

The comparison module 126 may be configured to compare the received sensed data with corresponding predictive data 129 associated with the climate in the building, weather outside the building and/or occupants of the building. The predicative data 129 may be associated with a reference model for the building, which will be discussed further below with respect to FIG. 3. The local adjustment module 125 may be configured to adjust one or more parameters associated with the climate of the building based on a result of the comparison of the received sensed data 127 and the predictive data 129. For example, if the predictive data 129 indicates that the building should cool down in 2 minutes and the sensor data 127 indicates that the cool down process is taking longer than two minutes, certain parameters may be adjusted to cool the building down faster. For example, the vents in the building may be opened wider and the air flow rate may be increased.

As used herein, "parameters associated with the climate" may refer, but are not limited, to air temperature, temperature of nearby surfaces, relative humidity, air flow (circulation), radiant surface temperatures (walls, floors, ceilings, windows), air circulation patterns (supply and return register operation, damper positions), air exchange rate, ventilation rate, combustion byproducts ($SO_X$, $NO_X$, CO, $CO_2$, and the like), dust loads (PPM 2.5, PPM 10), air flow (draft) in open chimneys, room pressure differentials, air filter loads (air flow through filters) and the like. It will be understood that the parameters set out herein are provided for exemplary purposes only and, therefore, embodiments of the present invention should not be limited to these examples. Any parameter associated with climate control may be adjusted in accordance with some embodiments of the present invention without departing from the scope of the invention.

The comparison module 126 may be further configured to compare the received sensed data 127 with local performance metrics and/or specifications 130 associated with the building. For example, the building may have certain performance metrics and/or specifications associated with the building, which may be used to regulate the climate in the building. The local adjustment module 125 may be further configured to adjust one or more parameters associated with the climate based on a result of the comparison of the received sensed data 127 and the local performance metrics and/or specifications 130 associated with the building. For example, the local performance specification 130 may indicate a certain energy efficiency and the sensed data 127 may indicate that the building is not achieving the specified energy efficiency. Thus, the local adjustment module 125 may be configured to adjust one or more parameters to bring the energy efficiency in line with the performance metrics and/or specifications 130.

Figure 1B:
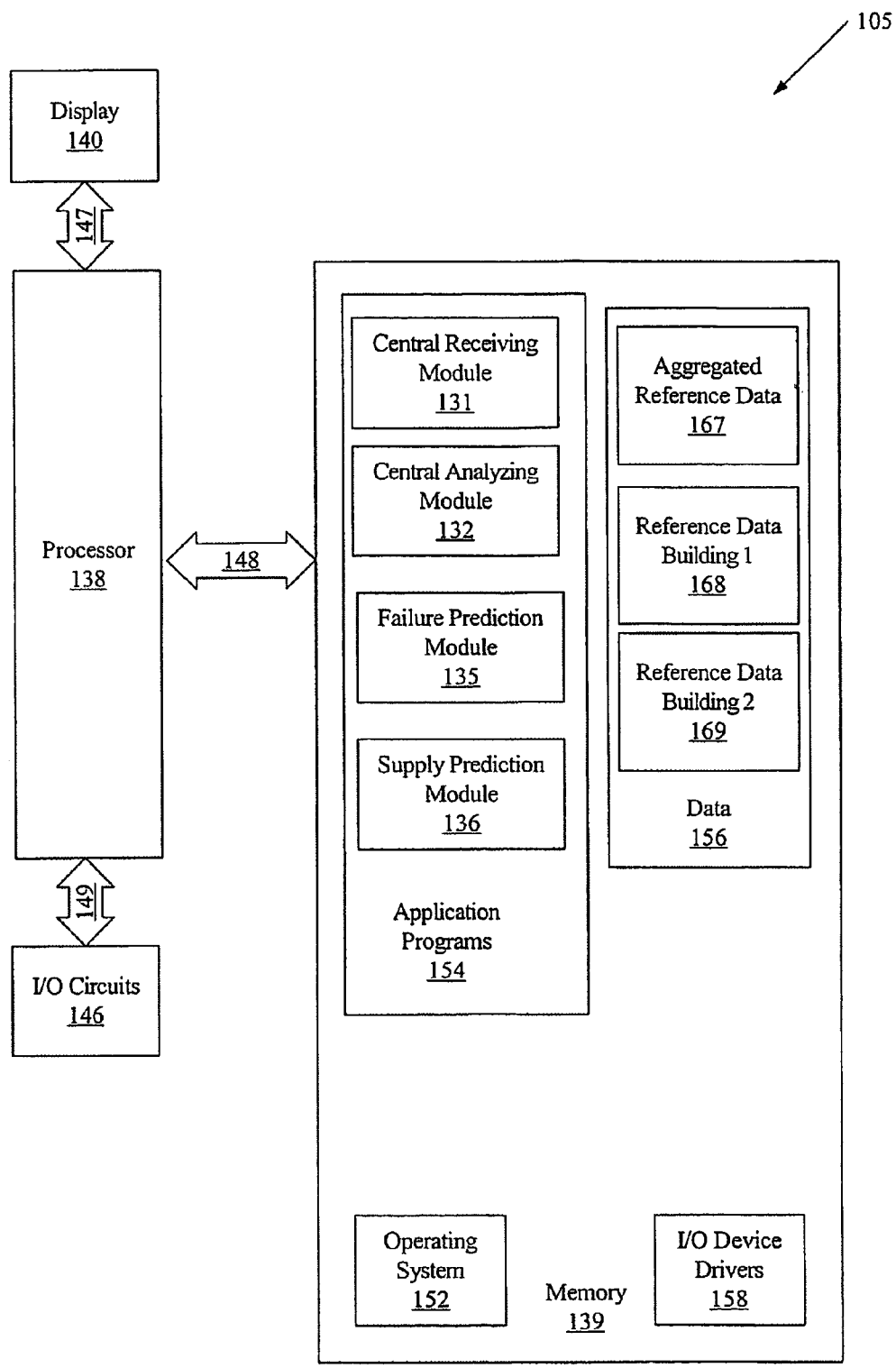

Referring now to FIG. 1B, an exemplary central data processing system 105 according to some embodiments of the present invention will be discussed. It will be understood that like numbered elements of FIG. 1A are substantially similar to like numbered elements of FIG. 1B and, therefore, the details with respect to these elements will not be discussed further herein. In particular, only the application programs 154 and the data 156 of FIG. 1B will be discussed in detail. As illustrated in FIG. 1B, the data 156 may include stored aggregated reference data 167, reference data associated with a first building 168 and reference data associated with a second building 169 for use by the circuits and modules of the application programs 154 according to some embodiments of the present invention as discussed further herein. It will be understood that, although only reference data associated with two buildings is illustrated, embodiments of the present invention are not limited to this configuration. As discussed above, three or more buildings may be coupled to the central server and, in fact, the more buildings used, the more accurate the reference model may be.

As further illustrated in FIG. 1B, the application programs 154 include a central receiving module 131, a central analyzing module 132, a failure predication module 135 and a supply prediction module 136. While the present invention is illustrated with reference to the central receiving module 131, the central analyzing module 132, the failure predication module 135 and the supply prediction module 136 being application programs in FIG. 1B, as will be appreciated by those of skill in the art, other configurations fall within the scope of the present invention. For example, rather than being application programs 154, the central receiving module 131, the central analyzing module 132, the failure predication module 135 and the supply prediction module 136 may also be incorporated into the operating system 152 or other such logical division of the data processing system 100, such as dynamic linked library code. Furthermore, while the central receiving module 131, the central analyzing module 132, the failure predication module 135 and the supply prediction module 136 are illustrated in a single data processing system, as will be appreciated by those of skill in the art, such functionality may be distributed across one or more data processing systems. Thus, the present invention should not be construed as limited to the configuration illustrated in FIG. 1B, but may be provided by other arrangements and/or divisions of functions between data processing systems. For example, although FIG. 1B is illustrated as having multiple modules, the modules may be combined into three or less or more modules may be added without departing from the scope of the present invention.

Referring to FIGS. 1A and 1B, the central receiving module 131 is configured to receive the sensed data associated with the buildings and sensed data associated with one or more other buildings. As discussed above, the more building from which data is collected, the more accurate the model and comparisons may be. The central receiving module 131 may also receive non-sensed data 128 without departing from the scope of the present invention. The central analyzing module 132 may be configured to analyze the received sensed data associated with the building and the one or more other buildings. The local receiving module 123 may be configured to receive, from the central processor, a control modification based on the analyzed sensed data. The local data processing module 125 may be configured to modify the local performance metrics and/or specifications associated with the building based on the control modification. For example, the performance metrics and/or specifications of a particular building may be being met or even exceeded, i.e. the sensed data is in line with the performance metrics and/or specifications. However, when the performance metrics and/or specifications of the building are compared to similar buildings, such as buildings of the same size, price range and the like, the performance metrics and/or specifications of the building may be being exceeded by performance of similar buildings. Accordingly, the performance metrics and/or specifications of the building may be changed based on the specifications being met by the other similar buildings. Thus, according to some embodiments of the present invention, climate control systems that appear to be operating within performance metrics and/or specifications at a local level, may be further improved by comparing the performance of the climate control system in the building with the performance of climate control systems in similar buildings, i.e., systemic problems may be identified and corrected.

Once the local performance metrics and/or specifications 130 are modified, the local comparison module 126 may be configured to compare the received sensed data with the modified local performance metrics and/or specifications. The local adjustment module 125 may be configured to adjust the climate based on a result of the comparison of the received sensed data and the modified local performance metrics and/or specifications associated with the building.

In some embodiments of the present invention, the local data processing module 125 is further configured to modify the predictive data 129 based on the control modification. As discussed above, the predictive data 129 may be associated with a reference model for the building, which will be discussed further below with respect to FIG. 3.

In some embodiments of the present invention, the local data processing module 124 may be configured to process the reference data before providing the reference data (sensed and/or non-sensed) to the central receiving module 131 of the central processor 105. For example, the amount of the reference data may be organized and reduced, normalized and/or used in calculations. In particular, the reference data may be processed at the building and reflect various physical and operational attributes of the building, such as square footage, roof surface, insulation type and material, amount of window surface, type of glass used in windows, orientation and geographic location of the building, infiltration at various wind speeds, heating and cooling expenses, and the like.

In some embodiments of the present invention, the local data processing module 124 may be configured to anonymize the reference data before the reference data is received at the central processor. The reference data may be anonymized to protect the privacy of the building occupants. However, for data analysis and model-building according to some embodiments of the present invention, the reference data can be associated with a particular building over time with the known characteristics of the building, for example, type of construction materials, number of square feet, volume of conditioned space, and longitude/latitude coordinates, or at least a rough idea of where the building is located geographically, so that regional climate conditions can be considered.

In order to allow these data elements to be related to one another, in some embodiments of the present invention, each building may be individually identifiable in the data set. For example, when data is obtained for the data set, each building may be associated with a corresponding identifier(s) used for the data records in the data set. Furthermore, in some embodiments of the present invention, an encryption methodology may be used in which one or more secret keys may be used to encrypt each building's true identifier into one or more anonymous identifiers. The anonymous identifiers may be used within the data set. The anonymous identifier for a given building will not typically change over time, so that data collected over time can be analyzed within the same frame of reference. In order to further obscure the data, in some embodiments of the present invention different data elements may use anonymous identifiers produced by different keys. For example, user interface transactions can be identified using one anonymous identifier, construction details using another, and performance data using a third. Each set of identifiers may be produced using a separate set of secret keys. These keys can be held by different parties, so that in order to combine the different data elements, multiple participants would have to be involved. This may reduce the likelihood that one party, holding only one of the keys, could violate the privacy policies of the organization. Joining these data sets together, to produce the complete picture of a building, may require the explicit cooperation of multiple parties.

Encryption methodologies are known to those having skill in the art and, therefore, will not be discussed in detail herein. In particular, various encryption algorithms and secret key mechanisms may be used to implement this anonymization strategy without departing from the scope of the present invention. For example, standard symmetric block ciphers, an asymmetric public/private key mechanism, or a combination thereof, may be used, as is common in other computer encryption systems. Alternatively, hashing algorithms, such as SHA1/SHA2, MD5, and the like may be used as a one-way encryption system.

In some embodiments of the present invention, the local receiving module 123 may be configured to receive a request for a thermal comfort condition and/or a request for an indoor air quality condition. For example, an occupant may issue a request to be cooler. The local adjustment module 125 may be configured to adjust one or more parameters associated with the climate of the building based on the received request so as to allow achievement of the requested thermal comfort condition, i.e., adjust the parameters that will make the occupant cooler. It will be understood that the local data processing module 124 may be configured to convert the received thermal comfort condition ("I want to be cooler") into a form usable by the local processor to adjust the one or more parameters. Thus, according to some embodiments of the present invention, the occupant can request a thermal comfort condition and control systems according to some embodiments of the present invention may adjust the appropriate parameters to achieve that condition based on the reference data.

In some embodiments of the present invention, a user interface, coupled to the local adjustment module 125, may be configured to receive a request to adjust the one or more parameters associated with the climate in the building. For example, an occupant of the building may request that the temperature of the building be lowered. The local adjustment module 126 may be configured to adjust the one or more parameters, lower the temperature, responsive to the received request. In some embodiments of the present invention, the user interface may be further configured to receive a unique user identification associated with a user entering the request before the request is provided to the local adjustment module 126 so as to allow the request to be associated with the user. According to some embodiments of the present invention, this information may be used to tailor climate parameters to optimize the thermal comfort of particular individuals within the building.

It will be understood that user interface according to some embodiments of the present invention may be any type of interface known to those of skill in the art, such as a touch pad, key pad, voice activated and the like. It will be further understood that user interfaces according to some embodiments of the present invention may more than simple displays. For example, a user interface may be a stand-alone computers with a dedicated display. This user interface may be networked to the central processor, and/or may be capable of analyzing user transactions locally, without having to communicate with the central processing system.

In some embodiments of the present invention, the local receiving module 123 may be configured to receive a request to adjust the one or more parameters associated with the climate from a location remote from the building. For example, an occupant of the building may decide to leave work early so that he can get a run on the treadmill before dinner. He may realize on his way home that the temperature in the workout room will not adjust to the workout temperature until 7 PM, his normal workout time. Accordingly, he calls the climate control system and requests that the temperature in the workout room be lowered to the workout temperature now. Thus, when he gets home, the workout room may be at the desired workout temperature. The local adjustment module 125 may adjust the temperature responsive to the received request. It will be understood that in some embodiments of the present invention, the request from the remote location may first go to the central processor and then be forwarded to the local receiving module 123 for security/privacy purposes.

In some embodiments of the present invention, the local adjustment module 125 may be configured to adjust the one or more parameters to maintain a predetermined pressure differential between an interior of the building and an exterior of the building. For example, the predetermined pressure differential may be adaptively maintained by allowing controlled amounts of air into the interior of the building. In particular, all buildings have a certain amount of air leakage, which may be expressed as a percentage of the total indoor air volume that is exchanged per hour (ACH), or as the amount of air (in cubic feet per minute) entering the interior air volume of the building when a pressure difference of 50 Pascals is induced between the indoor and the outside air space, a parameter called cfm50. Imperfections in the building envelope, such as cracks around windows and doors, as well as any gaps between individual construction elements, such as panels, which have not been joined or caulked properly, may all contribute to this leakage. Changes in wind speed and wind direction, as well as the stack effect, which is caused by convection as a response to solar radiation, may all result in pressure variations that can be observed at different parts of the building envelope. Thus, according to some embodiments of the present invention, the magnitude of the average pressure differential may be adapted dynamically and automatically according to current weather conditions, for example, when high outside wind speeds or gusts are detected, a higher average pressure differential may be maintained in order to reduce or eliminate infiltration.

Accordingly, the local receiving module 123 may be configured to receive pressure measurements from a plurality of sensors associated with a building. The local adjustment module 125 may be configured to adjust pressure between an interior of the building and an exterior of the building to maintain a predetermined pressure differential between the interior of the building and the exterior of the building.

Figure 2:
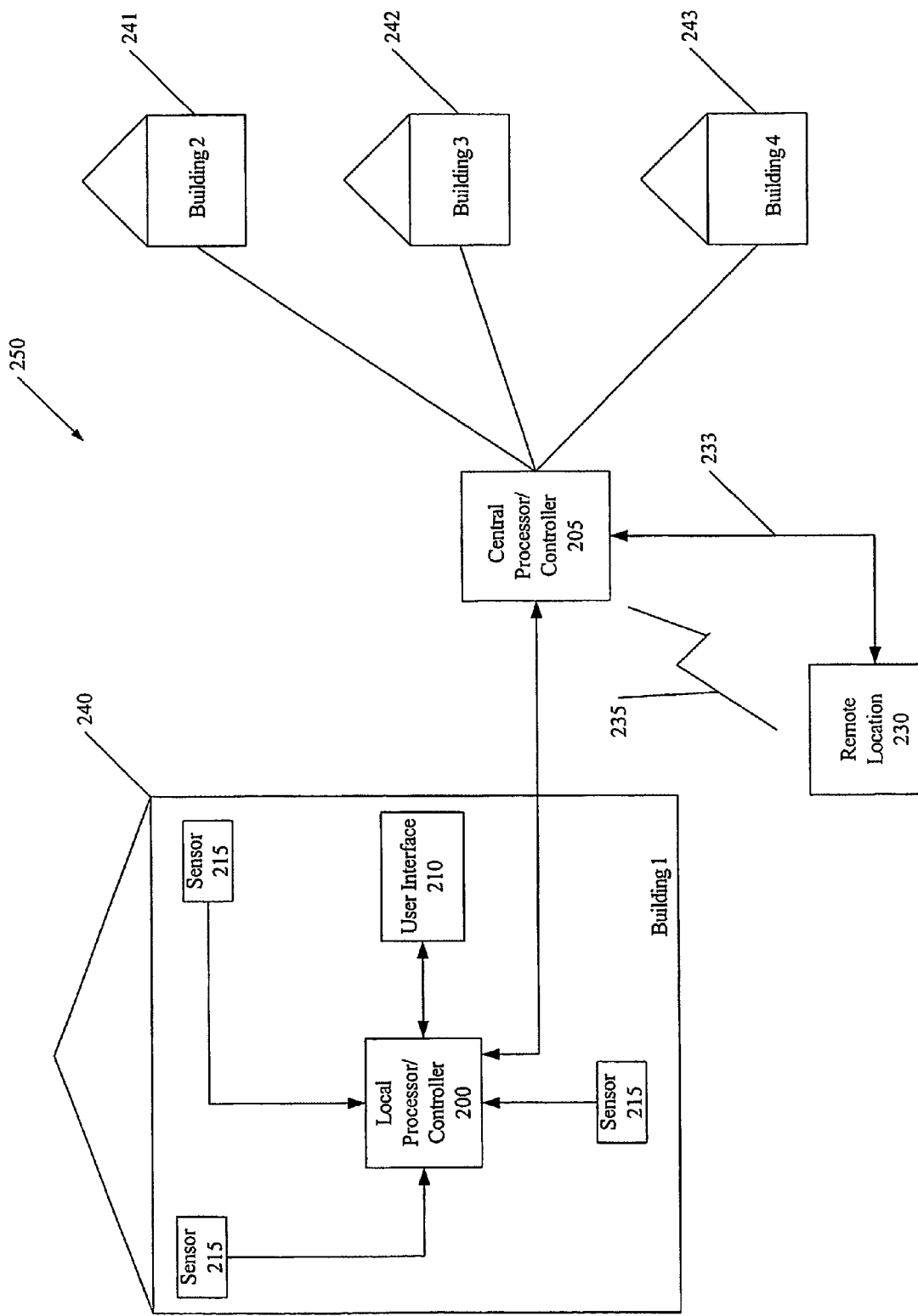
FIG. 2 is a block diagram illustrating an exemplary system according to some embodiments of the present invention.

As discussed above, a central processor 105 may be coupled to at least two local processors (100 of FIG. 1A) associated with corresponding at least two buildings as illustrated in FIG. 2. The central receiving module 131 may be configured to receive reference data from the at least two buildings. As discussed above, each local data processor receives reference data collected by one or more sensors positioned inside and/or outside the associated building. The central analyzing module 132 may be configured to analyze the reference data received from the building. For example, the central analyzing module 132 may be configured to compare and/or aggregate reference data from one building with reference data from one or more other buildings. For example, the central analyzing module 132 may identify a pattern in behavior associated one or more occupants of the building. For example, it may be observed from the reference data that a particular occupant always exercises at a particular time of day and usually adjusts the temperature of the workout room upon beginning his workout. According to some embodiments of the present invention, the occupant's pattern may be recognized and the temperature in the workout room may be adjusted 15 minutes before the usual workout time without any interaction with the occupant. Thus, the temperature in the work out room may be exactly where the occupant wants it before the workout begins.

In some embodiments of the present invention, performance metrics and/or specifications for a particular building may be analyzed. For example, it may be determined if performance metrics and/or specifications are being met based on the reference data. Thus, according to some embodiments of the present invention the performance metrics and/or specifications of a particular building may be compared to similarly constructed buildings in a similar climate region and indoor climate parameters may be adjusted accordingly. Furthermore, in some embodiments of the present invention, it may be determined if the performance metrics and/or specifications need to be updated, for example, based on changed circumstances, changed preferences of an occupant of the building and/or aging processes that may affect the building.

As discussed above, in some embodiments of the present invention requests from a remote location for a particular building may be routed through the central server 105 for security purposes. In these embodiments of the present invention, the central receiving module 131 may be further configured to receive a request to adjust one or more parameters associated with the climate of a particular building and the request may be forwarded to the particular building.

It will be understood that although the examples provided herein largely relate to adjustments of temperature, embodiments of the present invention are not limited by these examples. For example, in some embodiments of the present invention the failure prediction module 135 may be configured to use the aggregated reference data from multiple buildings to predict equipment failure. Furthermore, in some embodiments of the present invention, the supply prediction module 136 may be configured to predict an amount of supplies needed to construct a new building based on the aggregated reference data associated multiple buildings. For example, during the construction process, the building contractor may determine how much insulation should be purchased for the building. Using aggregated reference data according to some embodiments of the present invention, the building contractor may obtain data on the amount of insulation installed in buildings having square footage similar to the current building, in a similar price range, in a similar climate and the like. The building contractor may also obtain centrally processed reference data about energy costs and consumption associated with these buildings. This information may be used to determine exactly how much insulation should be purchased for the current building. For example, two buildings with X amount of insulation consumed a certain amount of energy and two other buildings with Y amount of insulation, less than X, consumed as little if not less energy. Thus, the building contractor knows that the added amount of insulation (X-Y) was not worth the cost in energy savings. Therefore, money may be saved in the purchase of insulation.

Referring now to FIG. 2, a climate control system including local and central data processing systems according to some embodiments of the present invention will be discussed. As illustrated in FIG. 2, a climate control system 250 according to some embodiments of the present invention may include first through fourth buildings 240, 241, 242 and 243, a central processor/controller 205, and a remote location 230. As further illustrated in FIG. 2, the first through fourth buildings 240, 241, 242 and 243 are coupled to the central processor/controller 205. The central processor/controller 205 may communicate with the first through fourth buildings 240, 241, 242 and 243 using, for example, a protocol that has been optimized, or adapted specifically for the purpose of this type of communication by incorporating, for example, explicit or implicit references, pointers or locators for processed reference data, performance metrics, time stamps, authentication codes, or anonymization process related variables.

As further illustrated in FIG. 2, the first building 240 (as well as the second through fourth buildings, although not illustrated in FIG. 2) includes one or more local processor/controllers 200, a user interface 210 and sensors 215. The user interface 210 and the sensors 215 are coupled to the one or more local processor/controllers 200. It will be understood that although only a single user interface 210 and three sensors 215 are illustrated in FIG. 2, embodiments of the present invention are not limited to this configuration. For example, two or more user interfaces 210 and hundreds of sensors 215 may be provided without departing from the scope of the present invention.

The local processor/controller 200 may include the modules and operate as discussed above with respect to FIG. 1A. Similarly, the central processor/controller 205 may include the modules and operate as discussed above with respect to FIG. 1B. The sensors 215 may be analog and/or digital and wired and/or wireless without departing from the scope of the present invention.

FIG. 2 further illustrates the remote location 230. This location may be, for example, a cell phone, office phone or the like, or any device with IP protocol enabled communications. A request may be received from the remote location from an occupant or owner of the building 240 or from any person given access by the owner, for example, HVAC personnel. The request may be provided over a physical connection 233 or wirelessly 235 as illustrated in FIG. 2. As discussed above, the request from the remote location 230 may be routed to the central processor 205 for security purposes. However, the request may be sent directly to the local processor 200 without departing from the scope of the present invention. It will be understood that the system 250 is described for exemplary purposes only and the embodiments of the present invention are not limited to this configuration.

According to some embodiments of the present invention, there are three principal stages within the life cycle of a building and the associated local processing system, each with its own unique data acquisition, processing and analysis requirements. The first is the initial planning stage, when functional requirements for the building and its occupants are determined. The second is the construction process, when it is verified that the building and its parts are built according to these specifications, and finally, the ongoing operation of the building, when the building and its parts are maintained such that the original or subsequently defined performance objectives are met on an ongoing basis. It will be understood that embodiments of the present invention may be used in all three stages or in only one or two of these stages without departing from the scope of the present invention.

During the planning stage, reference data is accumulated from architects, builders, home owners and the like. Reference data may include structural, HVAC equipment, air quality, and energy consumption variables, as well as implicit and explicit personal comfort variables of the occupants, such that they can be used by control systems according to some embodiments of the present invention to generate a comfortable and healthy environment for the occupants (individually and collectively) throughout the building, and also, if desired, for individual rooms.

The planning reference data is particularly useful when it is compared to the aggregated reference data from each of the buildings coupled to the central processor. The comparison results may be useful references for, for example, builders ("how did we do, compared to our competition"), HVAC equipment manufacturers ("how is our equipment doing, as installed in this particular instance, and also compared to an average installation") or HVAC contractors ("how was my installation crew performing this time, as compared to our previous installations, and to the industry average").

During the construction phase, for the purpose of constructing an airtight shell, and to ascertain the achievement of specified objectives, measurements can be taken at several stages of the actual construction. For example, a blower door test may be performed once the frame has been erected and the building envelope has been completed, including the installation of windows and doors, but before any of the drywall is installed on the inside. The blower door test may be conducted such that additional insulation and caulking can be performed during the test until a certain leakage threshold is reached. This threshold may be determined based on calculations and on data from the reference database that have been adapted to the specific circumstances of that particular building and its stated performance metrics and/or specifications.

Another measurement that can be performed during construction is the continued observation of the moisture content of certain structural components of the building. Using indoor climate control systems according to some embodiments of the present invention, these measurements can be performed throughout the construction process, with the data transmitted back continuously to the central database. Once the observed data exceeds a certain threshold that has been determined based on previous construction data stored in at the central processor, and corrected for local climate conditions, the builder can be notified, and he can take appropriate remedial action. Certain indoor air quality requirement specifications, determined earlier during the planning stage, may not be able to be met later on if the moisture content of the building structure exceeds certain levels at a point in time, for example, when these structural members are about to be enclosed, and do not have the ability to dry out further, which may result in mold growth, structural deterioration, and serious indoor air quality problems.

Some embodiments of the invention involve the formulas used for the calculation of performance thresholds during construction that use observed building performance data and planning data, and combines the observed building performance data and planning data with reference data that has been adapted and modified to reflect the specific circumstances of a particular building.

Thus, according to some embodiments of the present invention, construction stage data is collected on an ongoing basis and may be related back to the aggregated data at the central processor. Performance parameters for specified classes of buildings may be provided as reference data, so that a builder can check on the progress and the performance of his construction project, knowing that he is on track to reach certain structural performance objectives by the time the building is finished.

During the operation stage, after the building has been occupied by the owner, performance data may be acquired and stored on an on-going basis in the areas of thermal comfort, indoor air quality, equipment performance, energy consumption and conservation, and/or the protection of the structure and the property it contains. There are two overall objectives associated with this data acquisition. The first one is to ascertain that performance metrics and/or specifications are being met, and the second one is to detect if any of these performance requirements are changing due to changed circumstances or preferences of the home owner, or due to normal aging processes that affect the structure, such as decreasing effectiveness of insulation materials, or decreased air tightness.

The collection of reference data associated with the operation of the occupied building may be useful for a number of benchmarking activities by equipment and building material manufacturers, or for comparisons of energy efficiency of certain types of structures over time and under specific weather conditions.

Figure 3:
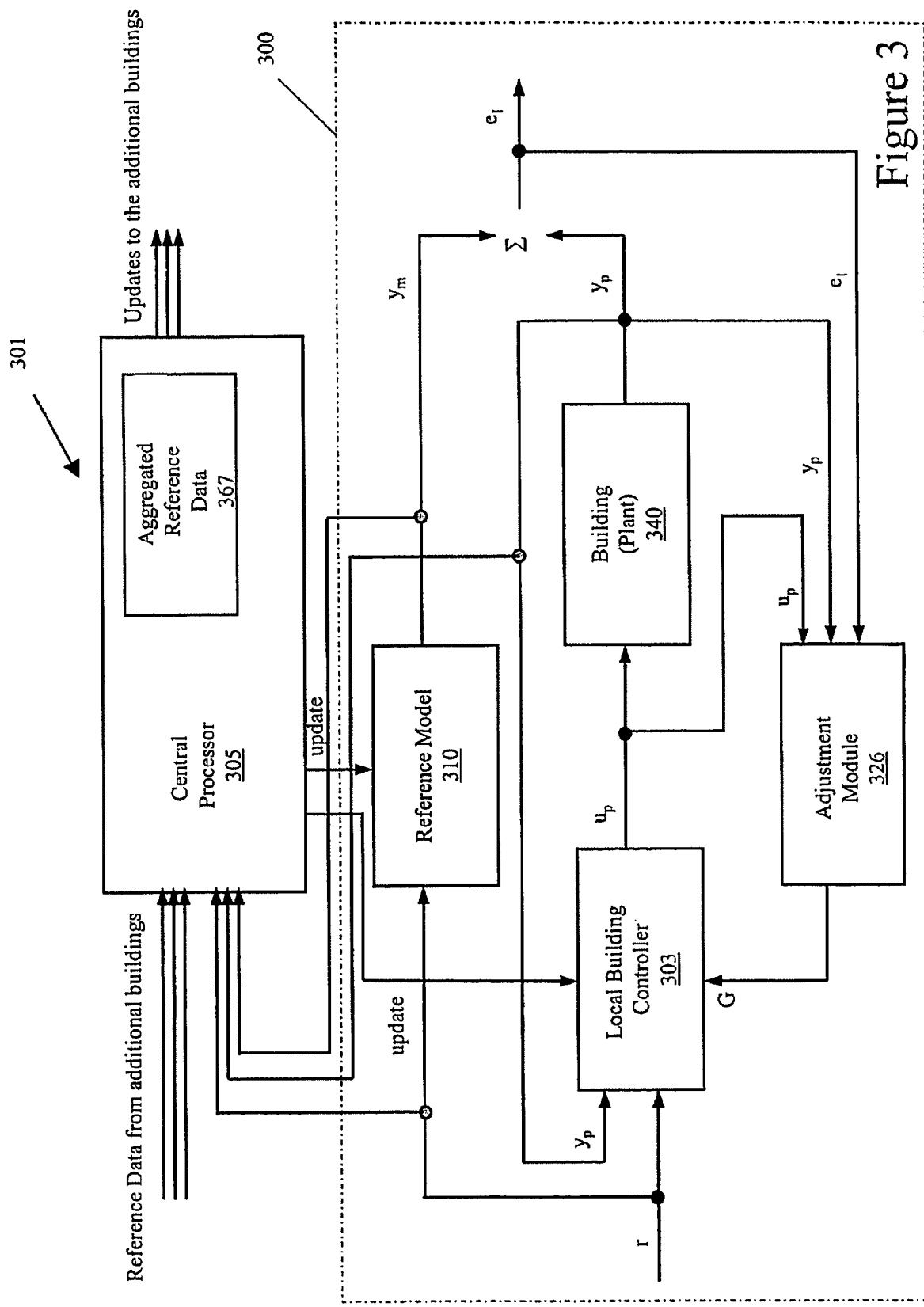
FIG. 3 is a block diagram illustrating control systems according to some embodiments of the present invention.

Referring now to FIG. 3, a block diagram illustrating an exemplary climate control system according to some embodiments of the present invention will be discussed. As illustrated in FIG. 3, the climate control system 301 includes a local data processor 300 and a central processor 301. Furthermore, the local data processor includes a reference model 310, a local building controller 303, a building (plant) 340 and an adjustment module 326. As further illustrated, the central processor 305 includes the aggregated reference data 367, which may include both sensed and non-sensed reference data as discussed above.

First, the local data processing system 300 and the elements thereof will be discussed. In particular, the local building controller 303 receives r and $y_p$, where r is the input command vector, which represents the planned intended state (performance metrics and/or specifications of the plant), and where $y_p$ is the actual plant output vector, represented by the actual sensed data, i.e., actual state of the building. These two inputs vectors are compared and if they are not the same, one or more parameters of the controller 303 are adjusted and the control output vector $u_p$ is modified accordingly. Thus, the controller 303 generates input parameters for the plant 340, such as, close the damper, turn on the heat, turn on the AC and the like. Since, the building (plant) 340 is not linear or time invariant, it experiences state changes due to windows opening, weather changes, humidity changes and the like. The output vector of the building (plant) 340 represents the actual plant state $y_p$, which is compared to the output of the reference model 310. If the sum $e_l$ (a tracking error vector) of $y_p$ and $y_m$ is not zero, then the adjustment module 326 adjusts a gain vector G until the sum of $y_p$ and $y_m$ is zero. Thus, the local data processing system 300 is capable of adjusting the climate in the building based on the reference data, sensed, non-sensed, predictive and performance metrics and/or specifications. For example, if the comparison of $y_m$ and $y_p$ indicates that the building in the same season last year operated 10 percent more efficiently and cooled 50 percent faster, control algorithms of the controller 303 may be adjusted to achieve similar results during the next season. Details with respect to the model reference adaptive control approach as discussed with respect to FIG. 3 are discussed in *Robust Adaptive Control* to P. A. Ioannou et al. (Prentice Hall, 1996, p. 314), the disclosure of which is hereby incorporated herein by reference as if set forth in its entirety.

As further illustrated in FIG. 3, the reference model 310 and the building controller 303 are updated by the central processor 305. For example, the local processing system 300 may appear to be operating flawlessly, however, when the actual sensed data from the building is compared to sensed data from other similar buildings, a systemic problem may be revealed. For example, the building may be consuming 10 percent more energy than the other similar houses. Accordingly, the reference model 310 may be updated such that the output $y_m$ of the reference model (predictive data) reflects the energy efficiency of the other buildings. The controller 303 may then adjust the parameters to achieve the desired efficiency.

As discussed above, the reference model according to some embodiments of the present invention is unique due to the derivation and the ongoing modification of the reference model 310 based on reference data 367 collected from different buildings. For example, when embodiments of the present invention are used in conjunction with a newly constructed building, the initial parameters for a reference model that is unique for that particular building may be derived from initial specifications collected during the planning phase of the building and from aggregated reference data 367 collected previously from other buildings coupled to the central sever (205 FIG. 2). Once the initial reference model 310 is constructed, it will be adapted and modified for the specific circumstances and operating conditions of this particular newly constructed building according to some embodiments of the present invention.

In particular, before the newly constructed building is occupied, the local processor controller (200 of FIG. 2) will move through a set of operating conditions which may allow the unique responses of the newly constructed building to be observed at that point in time; in essence, data that reflects the transfer function of the building at the end of the construction phase is being collected. This set of data allows modification and refining of the reference model 310 even further, such that it the reference model 310 can be adapted to the specific set of operating variables and set points of the building before the occupants have moved in.

Once the occupants move into the building, the control system may further adapt to the specific preferences of the occupants. The feedback from the occupants may be collected, for example, through the typical data acquisition and aggregation process described above. For example, the reference data is collected by the sensors (215 of FIG. 2) positioned inside and/or outside the building. Thus, the building is observed, and all the observed parameters that reflect the particular state of the building at any given point in time, as well as the interaction of individual occupants with the user interface (210 of FIG. 2) of the control system at this time, and in the context of specific indoor climate and system operating conditions.

For control systems according to some embodiments of the present invention, the (unknown) thermal comfort condition ("state") of each of the occupants may be deduced from observed occupant transactions, or the absence thereof. This information may be translated into specific state transitions of the climate control system. In particular, in some embodiments of the present invention, there are two modes of operation for the occupant state acquisition process. The first one is a passive observation mode as described above. Reference data associated with all relevant entities, i.e., the state of the building, the state of the climate control system, and the state of the occupants, is collected and analyzed over time, and translated into corresponding state transitions by the control algorithms of the control system (301, 303).

The second mode may be characterized by a steady state of all relevant entities as the starting point. The control system may then initiate a state transition, such as an increase in the speed of air circulation, or a step function in temperature, and observe the responses it receives from the occupants by way of user interface (210 of FIG. 2) transactions. As thermal comfort is generally dependent upon a number of independent environmental conditions, as well as certain genetic, physiological and psychological variables that are specific for each particular individual, control systems according to some embodiments of the present invention may have a complex set of state transitions that may eventually lead to a stable conclusion about the actual state of thermal comfort for a particular occupant.

In other words, individual occupants can therefore "teach" the climate control system according to some embodiments of the present invention about their own particular climate preferences, for a set of different situations, for example, "I'm going to sleep now", "I'm working out in the exercise room", or "I want to sit in the living room and watch TV." As discussed above, the user interface, according to some embodiments of the present invention, has a provision for each individual to identify himself or herself before making an entry. Thus, when several occupants are all present in a single room, the system may try to accommodate them collectively.

Thus, according to some embodiments of the present invention, each occupant may have the ability to define any number of personal climate preferences, and call anyone of them up for a particular room anytime they want. Furthermore, by observing the state of the building under various outdoor climate conditions, the control system 301 according to some embodiments of the present invention may also acquire a detailed knowledge about the performance of the building under these climate conditions, and may modify/adjust its state transitions accordingly.

As discussed above, systems according to some embodiments of the present invention include a centrally located processor/controller (205 of FIG. 2). The central processor may have remote access to all local processors/controllers (200 of FIG. 2) at all times. One benefit of this arrangement may be redundancy, and thus significantly increased reliability for individual building control systems. Furthermore, as discussed above, the ability to observe many individual control systems and their state transitions under a wide range of operating conditions may provide useful aggregated reference data 367. A central processor 305 may observe all relevant input, reference model, and building output vectors at all times. This may allow all connected systems to be monitored for quality control purposes. As further discussed above, it may also provide a host of individual system performance data (reference data) that can be used collectively to derive better performing control system algorithms. Similarly, reference models can be improved over time. The aggregated reference data 367 may be used to, for example, configure new local processors 300 before they are installed by, for example, adapting relevant parameters of the new system to the specific requirement specifications and structural variables of the new building.

Thus, according to some embodiments of the present invention, operating parameters of certain HVAC system components, such as filters, fans and compressors, are collected and stored, as well as data that characterize the specific house/building environment and the climate that they are operating in, plus their energy consumption. Some embodiments of the present invention combine the collected information with specific records about user transactions, which determine on-off cycles, run times, aggregate machine hours, and the like, and which have a significant affect on the longevity and durability of many of these system components. According to some embodiments of the present invention, the records are organized and aggregated by type of equipment, model and serial number across a number of different operating conditions and types of home environments at the central processor.

Thus, according to some embodiments of the present invention, ongoing analysis of several concurrent time series of equipment performance and user transaction data that are being collected under well documented building internal and external climate conditions may be possible. By comparing data from individual buildings with those that have been aggregated across many different types of buildings and operating conditions, otherwise invisible patterns may become apparent, and previously unknown failure modes may be identified and analyzed for the first time.

Some embodiments of the present invention combine local and remote real-time data analysis, thereby allowing equipment performance degradations to be recognized quickly, and appropriate maintenance efforts to be scheduled in a much more timely manner. Significant energy savings, and increased equipment longevity may also result.

As discussed above, in some embodiments of the present invention a very tight and well-insulated building envelope may be an important prerequisite for the effectiveness and the energy efficiency of the indoor climate control systems discussed herein. Such a building envelope provides an energy efficient way to maintain a predetermined pressure differential between the building interior and exterior under most weather conditions and, thus, may allow the reduction in unwanted infiltration or exhaust. This pressure differential can be adaptively maintained by bringing in controlled amounts of treated outside air. The tighter the building, the lower the amount of air that is required to maintain the desired building pressure.

Pressure differences between different parts of the building envelope may originate from a combination of wind speed, wind direction, and stack effect. Sensors (215 of FIG. 2) may be configured to capture pressure differentials between major outside wall surfaces and the inside of the building. The signal from these sensors may be of suitable resolution and frequency response to control fan speeds and the position of dampers that regulate the amount of outside air that is brought into the building, thereby creating the desired pressure differentials across each of the exterior walls. The signal may also allow pressure changes to be recognized that are caused by temporary events, such as open doors or windows, the use of kitchen exhaust fans, central vacuum systems, clothes dryers, bathroom fans, opened fireplace dampers, and the like. Thus, avoidance of the depressurization of the building for extended amounts of time may be desirable, especially in rainy weather conditions, or if outdoor air pollution is a major concern. In most of these cases, the system according to some embodiments of the present invention may respond close to, or in real-time in order to minimize the amount of infiltration caused by any depressurization.

Recent developments have led more and more indoor climate and thermal comfort experts to assert that humans do, in fact, have the ability to acclimatize, i.e., adapt to different climate and temperature environments over time. Thermal comfort as such is reasonably well understood, and is assumed to depend on individual variables, such as the level of metabolism, both at rest and for various levels of physical activity, the number and concentration of sweat glands, and the on the amount and the type of clothing a person is wearing. It further depends on the temperature and the relative humidity of the surrounding air, as well as the volume and the velocity of the local air circulation. Also important is the temperature of local surfaces in the vicinity of the individual, providing radiative heat gain or loss. If a person enters a warmer or a colder climate, biological adaptation mechanisms may begin to play a role that is not all that well understood at this time. It may take at least several days for a person to be comfortable again in a climate zone with significantly different average temperatures and relative humidities.

In a building with control over the radiant temperature of all major surfaces, and also of the velocity, temperature and humidity of the circulating air, changing the average indoor climate over time in a controlled manner may not represent a technical problem. If these changes are performed very gradually, and such that they are synchronized with the ability of the occupants to adapt easily to these changes, then such a slow climate change will most likely not even be noticed. The potential advantages are significant. The climate in such a building could gradually follow the seasonal increase or decrease of average temperatures and/or relative humidity, while maintaining close to perfect thermal comfort for the occupants at all times. It would allow them to step outside, for example, and not experience any serious thermal discomfort, and also save significant amounts of energy along the way.

The significant level of detail provided by some embodiments of the present invention about the particular state of the building itself, and of the state of the equipment involved in HVAC and indoor air quality control at any given point in time, may allow the provision of a much more sophisticated level of energy management than what is currently available on the market. For example, some embodiments of the present invention may allow derivation of very specific time constants that describe the response of both the building and its occupants to temperature changes, and therefore allow use this information to adapt the indoor climate to the variation of electrical utility tariffs over the course of the day. In other words, an intelligent form of load management may be provided without compromising thermal comfort, or indoor air quality.

Figure 4:
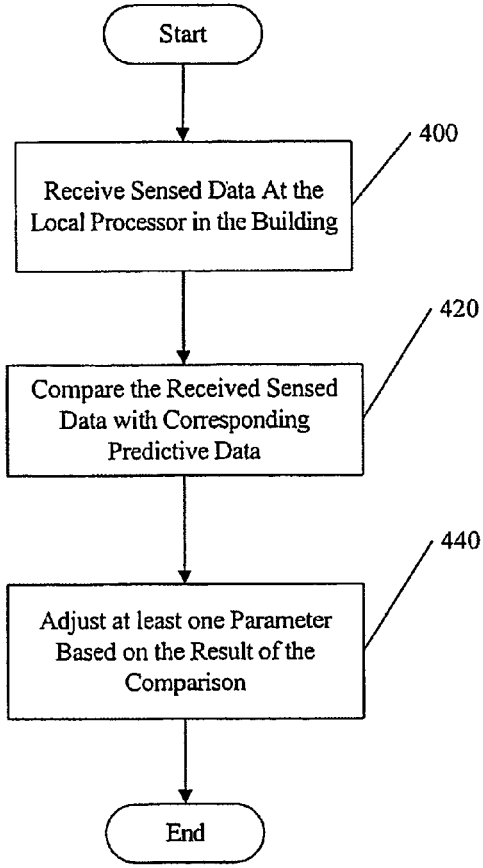
FIGS. 4 through 6 are flowcharts illustrating operations according to various embodiments of the present invention.
Figure 5:
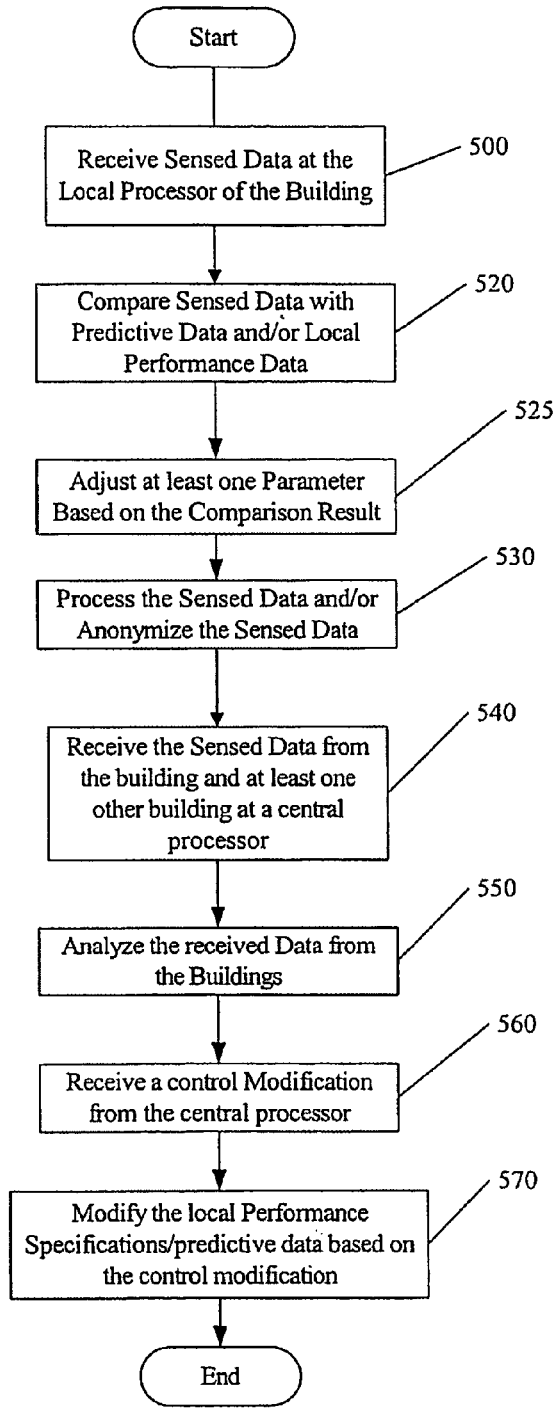

Operations of climate control systems according to some embodiments of the present invention will now be discussed with respect to the flowcharts of FIGS. 4 through 6. Operations begin at block 400 by receiving sensed data at a local processor in the building. The sensed data may be provided by one or more sensors inside and/or outside the building. The sensed data is associated with the climate in the building, weather outside the building and/or occupants of the building. The received sensed data is compared with corresponding predictive data associated with the climate in the building, weather outside the building and/or occupants of the building (block 420). The predictive data may be provided by a reference model which has access to all the reference data, both sensed and non-sensed. One or more parameters associated with the climate of the building is adjusted based on a result of the comparison of the received sensed data and the predictive data (block 440).

In some embodiments of the present invention, the one or more parameters may be adjusted to maintain a predetermined pressure differential between an interior of the building and an exterior of the building. The predetermined pressure differential may be maintained by allowing controlled amounts of air into the interior of the building.

Operations begin at block 500 by receiving sensed data at a local processor in the building. The received sensed data is compared with corresponding predictive data associated with the climate in the building, weather outside the building and/or occupants of the building and/or with local performance metrics and/or specifications associated with the building (block 520). The performance metrics and/or specifications may be assigned to the building during the planning and construction phases and updated once the building was occupied. One or more parameters associated with the climate of the building is adjusted based on a result of the comparison of the received sensed data and the predictive data or on a result of the comparison of the received sensed data and the local performance metrics and/or specifications associated with the building (block 525).

The sensed data may be processed and/or anonymized before it is received at the central processor (block 530). The data received at the central processor may be both sensed and non-sensed (reference data). The reference data may be processed at the building and reflect various physical and operational attributes of the building, such as: square footage, roof surface, insulation type and material, amount of window surface, type of glass used in windows, orientation and geographic location of the building, infiltration at various wind speeds, heating and cooling expenses, and the like.

The sensed data associated with the building and sensed data associated with one or more other buildings is received at the central processor (block 540). The more buildings that are coupled to the central processor the better the reference model as discussed above. The received sensed data associated with the building and the one or more other buildings is analyzed at the central processor (block 550). A control modification is generated based on the analyzed sensed data and is received at the local processor (block 560). The local performance metrics and/or specifications and/or predictive data may be modified based on the control modification (block 570). The modified local performance data and/or modified performance metrics and/or specifications may be used to adjust one or more parameters associated with the climate.

Figure 6:
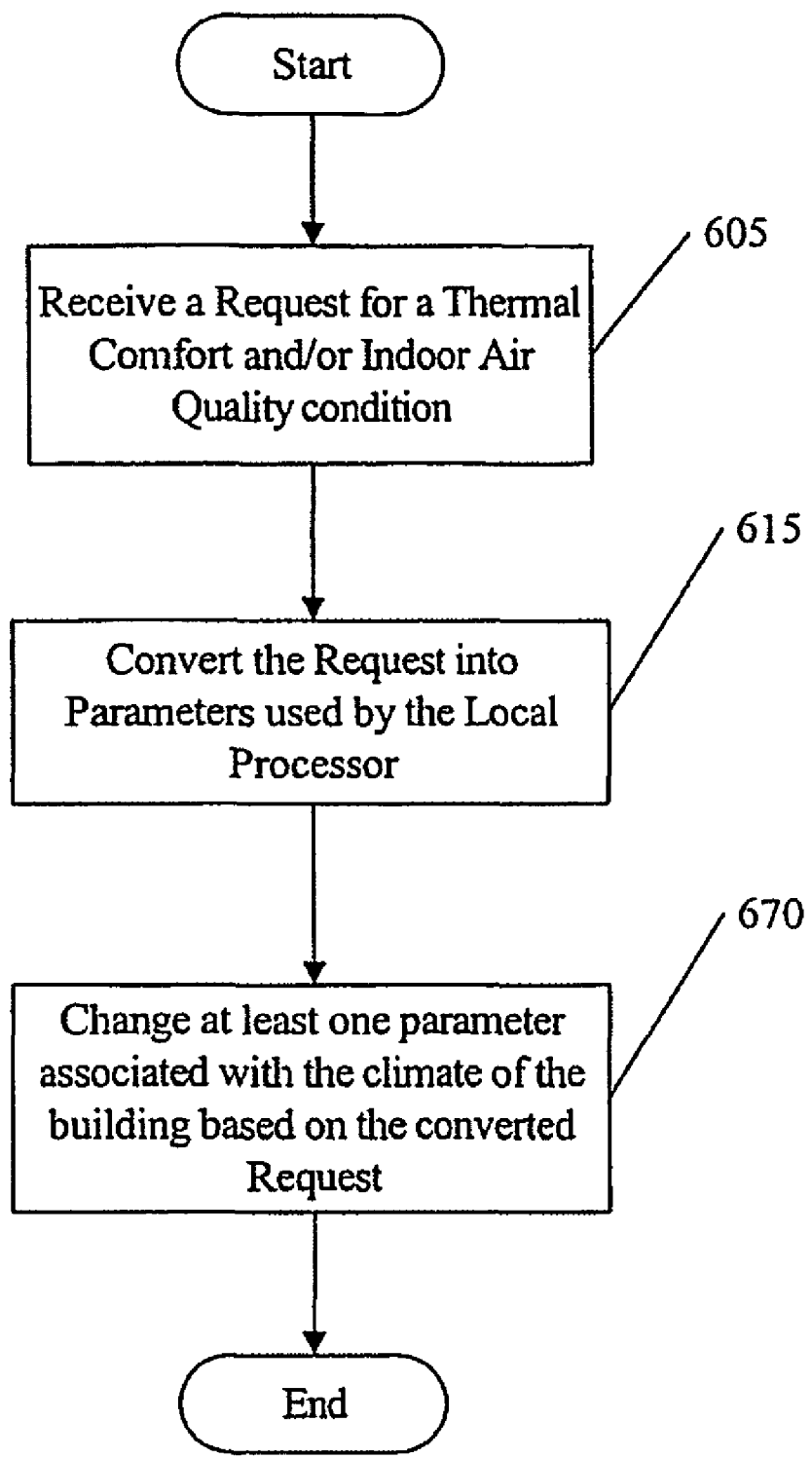

Referring now to the flowchart of FIG. 6, operations begin at block 605 by receiving a request for a thermal comfort condition and/or a request for an indoor air quality condition at a local processor in the building. For example, an occupant may ask to be cooler. The request for the thermal comfort condition and/or indoor air quality condition may be converted into parameters used by the local processor to control the climate in the building (block 615). One or more parameters associated with the climate of the building may be changed based on the converted request.

The flowcharts and block diagrams of FIGS. 1 through 6 illustrate the architecture, functionality, and operations of some embodiments of methods, systems, and computer program products for controlling a climate in a building. In this regard, each block represents a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed typical illustrative embodiments of the invention and, although specific terms are employed, they are used in a generic and descriptive sense only and not for purposes of limitation, the scope of the invention being set forth in the following claims.

That which is claimed is:

1. A method for controlling a climate in a building, the method comprising:
   receiving sensed data at a local processor in the building, the sensed data being associated with the climate in the building, weather outside the building and/or occupants of the building;
   comparing, at the local processor, the received sensed data with corresponding predictive data, the predictive data being based on the climate in the building and other buildings, weather outside the building and other buildings and/or occupants of the building and other buildings; and
   adjusting, at the local processor, at least one parameter associated with the climate of the building based on a result of the comparison of the received sensed data and the predictive data,
   wherein the local processor in the building communicates with a central processor associated with the building and the other buildings;
   wherein the local processor in the building is further configured to adjust the at least one parameter associated with the climate of the building for real-time minute-to-minute adjustments within the building and control the climate of the building without communicating with the central processor; and
   wherein the central processor is configured to update information at each of the local processors of each building based on data associated with the building and other buildings.

2. The method of claim 1, further comprising:
   comparing, at the local processor, the received sensed data with local performance metrics and/or specifications associated with the building, wherein adjusting further comprises adjusting at least one parameter associated with the climate based on a result of the comparison of the received sensed data and the local performance metrics and/or specifications associated with the building.

3. The method of claim 2, further comprising:
   receiving, at the central processor coupled to the local processor, the sensed data associated with the building and sensed data associated with at least one other building;
   analyzing, at the central processor, the received sensed data associated with the building and the at least one other building;
   receiving, at the local processor from the central processor, a control modification based on the analyzed sensed data; and
   modifying, at the local processor, the local performance metrics and/or specifications associated with the building based on the control modification.

4. The method of claim 3:
   wherein receiving further comprises receiving non-sensed data associated with the building and non-sensed data associated with the at least one other building;
   wherein analyzing, at the central processor, further comprises analyzing the received sensed and non-sensed data associated with the building and the at least one other building; and
   wherein receiving, from the central processor, further comprises receiving a control modification based on the analyzed sensed and non-sensed data, at the local processor.

5. The method of claim 3:
   wherein comparing, at the local processor, the received sensed data with local performance metrics and/or specifications associated with the building further comprises comparing, at the local processor, the received sensed data with the modified local performance metrics and/or specifications; and
   wherein adjusting further comprises adjusting at least one parameter associated with the climate based on a result of the comparison of the received sensed data and the modified local performance metrics and/or specifications associated with the building.

6. The method of claim 3, further comprising modifying, at the local processor, the predictive data based on the control modification.

7. The method of claim 3, wherein receiving, at the central processor coupled to the local processor, the sensed data associated with the building is preceded by:

processing the sensed data, at the local processor, such that the sensed data reflects physical attributes of the building.

8. The method of claim 3, wherein receiving, at the central processor, is preceded by anonymizing the sensed data associated with the building and/or the occupants of the building and the at least one other building and/or occupants of the at least one other building.

9. The method of claim 1, further comprising:

receiving, at the local processor, a request for a thermal comfort condition and/or an indoor air quality condition, wherein adjusting further comprises adjusting at least one parameter associated with the climate of the building based on the received request so as to allow achievement of the requested thermal comfort condition and/or the indoor air quality condition.

10. The method of claim 9, further comprising converting, at the local processor, the received request for the thermal comfort condition and/or the indoor air quality condition into a form usable by the local processor to adjust the at least one parameter.

11. The method of claim 1, wherein adjusting further comprises adjusting the at least one parameter to maintain a predetermined pressure differential between an interior of the building and an exterior of the building.

12. The method of claim 11, wherein adjusting to maintain further comprises maintaining the predetermined pressure differential by allowing controlled amounts of air into the interior of the building.

13. A method according to claim 1 carried out by a computer program product embodied in a computer readable medium.

14. A method according to claim 3 carried out by a computer program product embodied in a computer readable medium.

15. A method according to claim 4 carried out by a computer program product embodied in a computer readable medium.

16. A method for controlling a climate in a building, comprising:

receiving a request for a thermal comfort condition and/or an indoor air quality condition at a local processor in the building;

converting, at the local processor, the request for the thermal comfort condition and/or the request for the indoor air quality condition into parameters used by the local processor to control the climate in the building; and changing, at the local processor, at least one parameter associated with the climate of the building based on the converted request for the thermal comfort condition and/or the request for the indoor air quality condition and reference data associated with the building and at least one other building, wherein the local processor in the building communicates with a central processor associated with the building and the at least one other building;

wherein the local processor in the building is further configured to change the at least one parameter associated with the climate of the building for real-time minute-to-minute changes within the building and control the climate of the building without communicating with the central processor; and wherein the central processor is configured to update information at each of the local processors of each building based on data associated with the building and the at least one other building.

17. A system for controlling a climate in a building, the system comprising:

a local receiving module at a local processor in the building configured to receive sensed data, the sensed data being associated with the climate in the building, weather outside the building and/or occupants of the building;

a comparison module, at the local processor, configured to compare the received sensed data with corresponding predictive data, the predictive data being based on the climate in the building and other buildings, weather outside the building and other buildings and/or occupants of the building and other buildings; and a local adjustment module, at the local processor, configured to adjust at least one parameter associated with the climate of the building based on a result of the comparison of the received sensed data and the predictive data, wherein the local processor in the building communicates with a central processor associated with the building and the other buildings;

wherein the local processor in the building is further configured to adjust the at least one parameter associated with the climate of the building for real-time minute-to-minute adjustments within the building and control the climate of the building without communicating with the central processor; and wherein the central processor is configured to update information at each of the local processors of each building based on data associated with the building and other buildings.

18. The system of claim 17:

wherein the comparison module is further configured to compare, at the local processor, the received sensed data with local performance metrics and/or specifications associated with the building; and wherein the local adjustment module is further configured to adjust at least one parameter associated with the climate based on a result of the comparison of the received sensed data and the local performance metrics and/or specifications associated with the building.

19. The system of claim 18, further comprising:

a central receiving module, at the central processor coupled to the local processor, configured to receive the sensed data associated with the building and sensed data associated with at least one other building;

a central analyzing module, at the central processor, configured to analyze the received sensed data associated with the building and the at least one other building, wherein the local receiving module is further configured to receive, from the central processor, a control modification based on the analyzed sensed data; and a local data processing module, at the local processor, configured to modify the local performance metrics and/or specifications associated with the building based on the control modification.

20. The system of claim 19:

wherein the central receiving module is further configured to receive non-sensed data associated with the building and non-sensed data associated with the at least one other building;

wherein the central analyzing module is further configured to analyze the received sensed and non-sensed data associated with the building and the at least one other building; and wherein the local receiving module is further configured to receive a control modification based on the analyzed sensed and non-sensed data, at the local processor.

21. The system of claim 19:

wherein the local comparison module is further configured to compare the received sensed data with the modified local performance metrics and/or specifications; and wherein the local adjustment module is further configured to adjust the climate based on a result of the comparison of the received sensed data and the modified local performance metrics and/or specifications associated with the building.

22. The system of claim 19, wherein the local data processing module is further configured to modify the predictive data based on the control modification.

23. The system of claim 19, wherein the local data processing module is further configured to process the sensed data, at the local processor, such that the sensed data reflects physical attributes of the building before the sensed data associated with the building is received by the central receiving module.

24. The system of claim 19, wherein the local data processing module is further configured to anonymize the sensed data associated with the building and the at least one other building before the sensed data associated with the building and the at least one other building is received by the central receiving module.

25. The system of claim 17:

wherein the local receiving module is further configured to receive a request for a thermal comfort condition; and wherein the local adjustment module is further configured to adjust at least one parameter associated with the climate of the building based on the received request so as to allow achievement of the requested thermal comfort condition.

26. The system of claim 25, wherein the local data processing module is further configured to convert the received thermal comfort condition into a form usable by the local processor to adjust the at least one parameter.

27. A method for controlling a climate in a building using a collective performance model based on data associated with a plurality of buildings, the method comprising:

receiving sensed data at a local processor in the building, the sensed data being associated with the climate in the building, weather outside the building and/or occupants of the building;

providing the received sensed data to a central processor, the central processor being configured to receive sensed data from the building and a plurality of other buildings, analyze the received sensed data from the building and the plurality of other buildings and provide control modifications to the building based on the analyzed sensed data;

receiving, at the local processor from the central processor, the control modifications; and modifying, at the local processor, local performance metrics and/or specifications associated with the building based on the control modification, wherein the local processor in the building communicates with the central processor associated with the building and the plurality of other buildings;

wherein the local processor in the building is further configured to modify local performance metrics and/or specifications associated with the building for real-time minute-to-minute modifications within the building and control the climate of the building without communicating with the central processor; and wherein the central processor is configured to update information at each of the local processors of each building based on data associated with the building and the plurality of other buildings.

28. The method of claim 27, wherein the control modifications comprise a statistical representation of the sensed data and control processes associated with the building and the plurality of other buildings.

29. The system of claim 17, wherein the central processor is further configured to transmit rate incentives and/or other instructions from the utility to the local processor of the building and other buildings.

* * * * *